Aug. 13, 1929.  E. L. JAMES  1,724,596
AUTOMOTIVE CONTROL ATTACHMENT
Filed Nov. 19, 1926
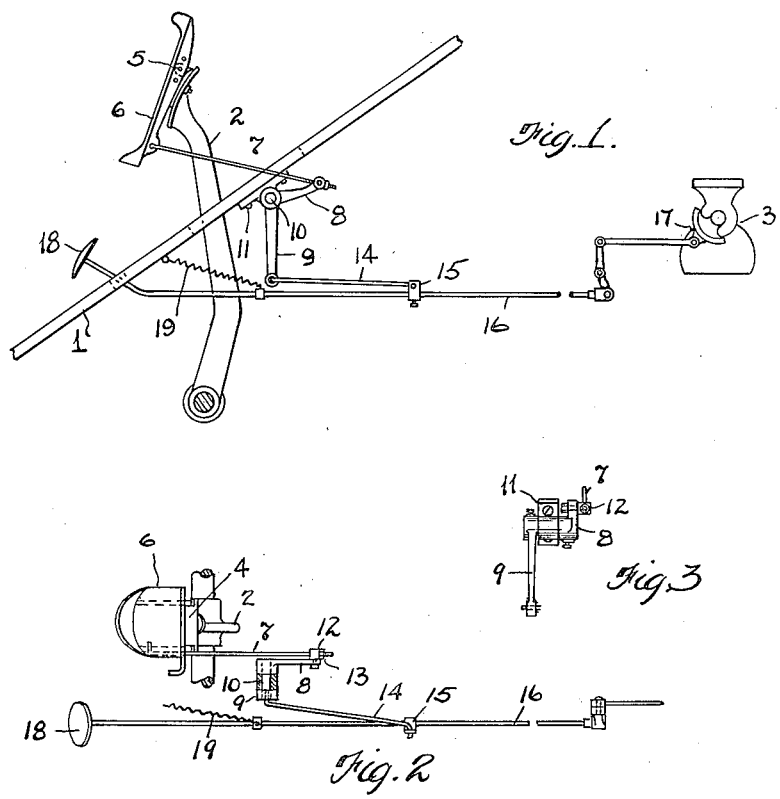
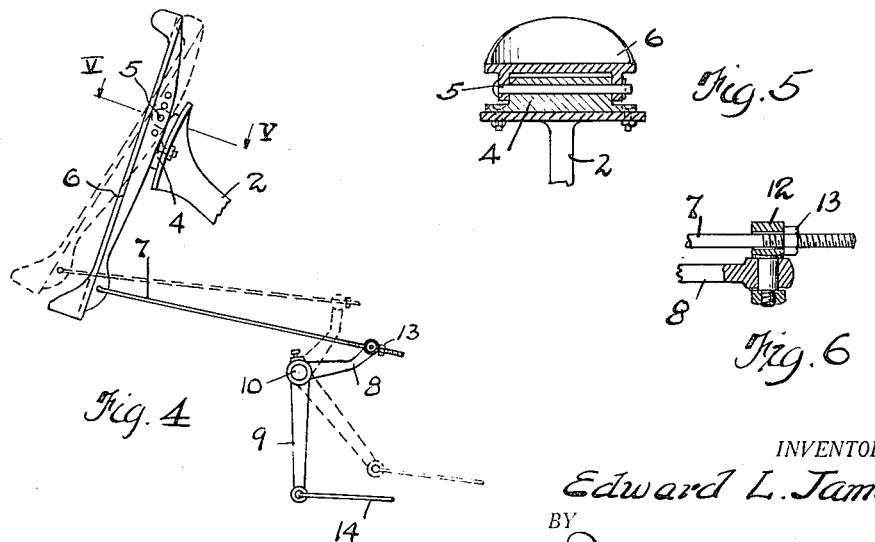
INVENTOR.
Edward L. James.
BY
Fay, Oberlin & Fay
ATTORNEYS.

Patented Aug. 13, 1929.

1,724,596

UNITED STATES PATENT OFFICE.

EDWARD L. JAMES, OF EAST CLEVELAND, OHIO.

AUTOMOTIVE CONTROL ATTACHMENT.

Application filed November 19, 1926. Serial No. 149,344.

This invention relates to machine elements, and more particularly to automotive control devices; and it is among the objects of the invention to provide an accessory attachment directly adaptable to the various standard cars, and without necessity of expert skill. Other objects and advantages will appear as the description proceeds.

To the accomplishment of the foregoing and related ends, the invention, then, consists of the means hereinafter fully described, and particularly pointed out in the claim, the following description and the annexed drawing setting forth in detail but one of the various ways in which the principle of the invention may be applied.

In said annexed drawing:

Fig. 1 is a view partly in section and partly in elevation showing an embodiment of my improved control accessory applied to an automobile; Fig. 2 is a plan view; Fig. 3 is a detail; Fig. 4 is an enlarged elevational detail; Fig. 5 is a sectional detail on the line V—V, Fig. 4; and Fig. 6 is an enlarged detail of a portion of the structure shown in Fig. 2.

As shown in the drawing, the reference character 1 designates a portion of the front floor of an automobile, the reference numeral 2 designates a brake pedal and the numeral 3 a carburetor, all of any usual construction. Upon such a pedal is adaptable an attachment plate 4, the same being boltable to the pedal face; and pivotally mounted at 5 on the plate is a foot-piece 6 to which is connected a link 7. The other end of the link has an adjustable connection to an arm 8 of a bell crank lever, the remaining arm 9 of which is secured to a stud shaft 10 in common, this affording a convenient means of mounting with the bracket 11 to the floor underneath. Advantageously, the link 7 may extend through an opening in a head 12 which is pivoted in the end of the arm 8. A screw-threaded adjustable stop 13 is arranged to engage against the far side of the head 12, as the link 7 is moved in one direction, but allowing the link to slide freely through the head when moved in the opposite direction. The arm 9 carries a link 14 which by means of a clip 15 and set screw takes on to an accelerator rod 16, which may be that already on the machine, or if lacking may be provided, connecting to the throttle lever 17 of the carburetor 3.

In use, the foot-piece may be tilted on its pivot 5 without moving the bracket pedal 2 or the pedal may be moved as a whole, the operator's foot accomplishing either movement as desired. By tilting the foot-piece, the link 7 is drawn correspondingly and actuates the bell crank lever 8 and thus in turn the link 14 and the accelerator rod 16 to open the throttle as desired. This makes possible the throttle control by the operator's foot without necessitating removal from the brake pedal generally, and thus quick action may be had. By depressing the brake pedal as a whole, the normal functioning of the brake may be had, the link 7 in such case sliding inactively through the head 12 on the arm 8 so as not to move the accelerator rod and throttle.

As will thus be seen, the construction as a whole affords an attachment which may very readily be applied to standard cars generally, the exigencies of the various cases being well embraced in the slight changes of proportion which may be required in the length of the stud 10 and the separation of the arms 8 and 9, or in some cases the link 7 may be directly extended to the clip 14, thus taking directly onto the accelerator rod. When the accelerator rod equipment is already in position, this may be directly availed of, and the foot-piece 18 thereof may be available for use if so desired, or it may be removed as preferred.

Other modes of applying the principle of the invention may be employed, change being made as regards the details disclosed, provided the means stated in the following claim, or the equivalent of such be employed.

I therefore particularly point out and distinctly claim as my invention:—

A control attachment for automobiles, which comprise a plate adapted to be secured to the face of an automobile pedal, a foot-piece pivoted to said plate, a link connected to said foot-piece, a bell crank lever, said link extending through a head pivoted on one arm of said lever and having an adjustable stop engaging therebehind, and a second link extending from the other arm of the bell crank lever to connect by an adjustable clip to the accelerator rod.

Signed by me this 18th day of November, 1926.

EDWARD L. JAMES.